United States Patent [19]
Swanson

[11] 3,730,539
[45] May 1, 1973

[54] CHUCK OF HIGH-LOW OPERATION

[75] Inventor: Linwood B. Swanson, Newington, Conn.

[73] Assignee: Cushman Industries, Incorporated, Hartford, Conn.

[22] Filed: Mar. 4, 1971

[21] Appl. No.: 120,820

[52] U.S. Cl..................................279/4, 279/106
[51] Int. Cl.........................B23b 31/18, B23b 31/30
[58] Field of Search.........................279/4, 106, 109

[56] References Cited

UNITED STATES PATENTS

| | | | |
|---|---|---|---|
| 1,390,961 | 9/1921 | Runge et al. | 279/106 |
| 3,091,256 | 5/1963 | Becker | 279/4 |

*Primary Examiner*—Francis S. Husar
*Attorney*—Walter Spruegel

[57] ABSTRACT

A chuck and an actuating device therefor, of which the chuck features rocker jaws with follower ends, and an axially movable jaw actuator having spaced faces in planes normal to the chuck axis with which the follower ends of the jaws are in line contact, and the actuating device provides a cylinder with a piston therein connected with the jaw actuator, and fluid-pressure distributing and control means sequentially operable to admit fluid of a given high pressure to the chuck-closing cylinder end and vent the chuck-opening cylinder end for exertion of a heavy work grip by the jaws, then to bleed fluid from the chuck-closing cylinder end until the pressure of the fluid therein reaches a given low level and hold it at this level for exertion of a lighter work grip by the jaws, and finally to admit fluid pressure into the chuck-opening cylinder end and vent the chuck-closing cylinder end to open the chuck.

4 Claims, 4 Drawing Figures

Fig. 1

INVENTOR
Linwood B. Swanson
BY
ATTORNEY

CHUCK OF HIGH-LOW OPERATION

This invention relates to chucks in general, and to fluid-actuated chucks in particular.

Fluid-actuated chucks commonly have a cylinder with a piston therein which by a drawbar is connected with the jaw-actuator of the chuck, and provisions for admitting fluid-pressure to either "chuck-closing" or "chuck-opening" cylinder end and simultaneously venting the opposite cylinder end.

The present invention is concerned with fluid-actuated chucks of a type which lend themselves to so-called "high-low" operation, meaning that such a chuck will hold work with an initial heavy grip which is followed by a lighter grip without relinquishing the work grip in the course of changing from the heavy to the lighter grip. Such high-low chuck operation is highly desirable for many operations on work, such as, for example, extensive internal machining of externally gripped work in the course of which the work becomes more fragile, wherefore the work grip is changed from heavy to lighter at a stage of the machining operation where a continued heavy work grip would or might fracture the work during the remainder of the machining operation. High-level chuck operation is further advantageous in that machining of work will proceed with the greatest accuracy, and avoid possible inaccurate finish-machining of work and even spoilage of the same for any useful purpose in the alternative procedure of rechucking the work between machining. In prior chucks of this type the work is initially held with a heavy grip by admitting to the chuck-closing cylinder end fluid from a high-pressure source, which is followed at the scheduled time for changing the work grip from heavy to lighter by rapidly bleeding fluid from the chuck-closing cylinder end until the pressure of the remaining fluid therein drops to a preassigned minimum below preset "low" pressure which is required to hold the work with the lighter grip, whereupon immediately thereafter there is admitted to the chuck-closing cylinder end fluid at the preset low pressure and the fluid therein is held at the latter pressure to the end of the operation. The reason for thus momentarily dropping the pressure of the operating fluid in the chuck-closing cylinder end to the preassigned minimum is to thereby relax the heavy work grip in the first place in order that the desired lighter work grip may exert itself. Thus, it is an inherent characteristic of chucks of most kinds of jaw motion and actuation that some operating chuck parts are locked rather firmly in tight binding engagement with each other and other chuck parts when exerting a heavy work grip, and it is to the end of permitting the thus locked chuck parts to unlock for relaxation of the heavy work girp that the pressure of the operating fluid in the chuck-closing cylinder end is momentarily dropped to a minimum at which this is achieved. In this connection, diagrams on which jaw pressure is plotted against the pressure of fluid in the chuck-closing cylinder end for chucks for most kinds of jaw motion and actuation indicate an increase in jaw pressure substantially proportional with increase in pressure of operating fluid admitted into this cylinder end, but indicate decrease in jaw pressure which is way out of proportion with, and lags greatly behind, continuously decreasing pressure of the fluid in this cylinder end. Just to give an example, such a diagram for a chuck of a certain conventional kind indicates that for a reduction from an exemplary heavy jaw pressure of 8000 lbs. sustained at a fluid pressure of 58 p.s.i. in the chuck-closing cylinder end, to an exemplary lighter jaw pressure of 4000 lbs., the fluid pressure in this cylinder end has to be reduced to 11 1/2 p.s.i. in order to unlock the locked chuck parts and relax the jaw pressure to 4000 lbs., but the diagram also indicates that in order to then hold the jaw pressure at 4000 lbs., the fluid pressure in the chuck-closing cylinder end must quickly be increased to, and held at, 29 p.s.i. Now, if the reduction of the fluid pressure in the chuck-closing cylinder end from 58 p.s.i. were stopped at 29 p.s.i., the jaw pressure would not relax to 4000 lbs., but would according to the diagram relax to 7600 lbs. and remain there for an indeterminate time while the fluid pressure in the chuck-closing cylinder end remains at 29 p.s.i.

While prior high-low chuck operation in this fashion is satisfactory in some respects, it is objectionable in a few, but important, respects. Thus, for success of an intended high-low chuck operation, it is virtually imperative to determine the minimum fluid pressure in the chuck-closing cylinder end at which the jaw pressure relaxes to the desired lighter jaw pressure. This is a rather complex task in any event, and is to be repeated for each one of even identical chucks of the same intended high-low operation, because the firmness of the lock of operational parts in tight binding engagement with each other and other parts of identical chucks on heavy work grip exertion, as well as the response in work-grip relaxation to diminishing fluid pressure in the chuck-closing cylinder end, will vary with even close tolerances in the dimensions and coordination of the chuck parts. Also, at least as objectionable is the introduction of potential malfunction of, and even hazard in, high-low chuck operation by the imperative, and even though only momentary, drop of the fluid pressure in the chuck-closing cylinder end to the determined minimum. Thus, if the chuck is a rotary one, as in most cases, it is imperative for safety's sake to stop the chuck drive during this pressure drop of the fluid in the chuck-closing cylinder end to the determined minimum, and this requires as much time and as much attention as rechucking the work. Moreover, while this momentary minimum fluid pressure will for most operations establish the work grip at the desired light and safe level, it cannot prevent relaxation of the work grip below this level due to a possible contributory cause, such as, for example, a reactive yielding force on rare occasions from a particular work piece on the gripping jaws with a slight tendency to open the chuck. The basic weakness of prior chucks of this type which accounts for these and still other objectionable aspects of their high-low operation, thus lies in the concept of coping with really unpredictable operational binding forces in existing chucks by rigid fluid pressure compensation in the chuck-closing cylinder end.

It is the primary object of the present invention to provide a chuck of this type whose high-low operation has none of the aforementioned and other objectionable aspects of, and is also otherwise superior to, prior high-low chuck operation.

It is another object of the present invention to provide a chuck of this type of which the jaw pressure, besides increasing substantially proportionately with increasing pressure of fluid in the chuck-closing cylinder end, also decreases for all practical intents and purposes proportionately with decreasing pressure of fluid in the same cylinder end. This gives rise to a present new high-low chuck operation, involving chucking work with a heavy grip on admitting to the chuck-closing cylinder end fluid from a high-pressure source, and at the scheduled time in the operation for changing the work grip from heavy to lighter, bleeding fluid from the chuck-closing cylinder end until the pressure of the remaining fluid therein drops to a preassigned low level at which the work grip is reduced to the desired lighter grip, and then holding the pressure of the fluid in this cylinder end at the low level to the end of the operation, while continuing the drive of the chuck, if rotary, throughout the operation.

It is a further object of the present invention to provide a chuck of this type of the aforementioned new high-low operation which, besides a chuck-actuating cylinder and piston component with valve and pressure controls therefor, has a chuck component of which the jaw pressure also decreases for all practical intents and purposes proportionately with decreasing pressure of fluid in the chuck-closing cylinder end as aforementioned. To this end, the chuck component has jaws which are pivoted in the chuck body, and are operatively connected with an axially slidable actuator in the body by having line contact with either of two opposite jaw-closing and jaw-opening faces of the actuator in parallel planes normal to the chuck axis. With this arrangement, any operational binding lock between the jaws and actuator is avoided at any stage of a high-low operation, and such binding as will occur between the jaws and their pivot supports on exertion by the jaws of a work grip of any magnitude will easily give way to operational stresses in the jaws that tend to, and will, relax the work grip as the pressure of the fluid in the chuck-closing cylinder end begins its scheduled intermediate drop from high to low in the operation.

Another object of the present invention is to provide a chuck of this type in which the aforementioned operational binding between the jaws and their pivot supports on exertion by the jaws of a work grip of any magnitude, may be further reduced, by lubrication of their respective bearing surfaces, or by providing the jaws with fast pivots which rest with their ends in antifriction bearings in the chuck body.

A further object of the presnt invention is to provide a chuck of this type of which the aforementioned valve and pressure controls for the cylinder and piston component are arranged so that for the scheduled operational shift from heavy work grip to lighter work grip operating fluid is bled from the chuck-closing cylinder end until the pressure of the fluid therein drops to the preassigned low level, whereupon the remaining fluid is locked therein at this low level or, alternatively, fluid from a source of the preassigned low-level pressure is admitted to the chuck-closing cylinder end to the end of the high-low operation, with this fluid source of low-level pressure being advantageously a pressure reducing valve supplied from a high-pressure fluid source so that the latter is the only fluid-pressure source required for high-low chuck operation.

Further objects and advantages will appear to those skilled in the art from the following, considered in conjunction with the accompanying drawings.

In the accompanying drawings, in which certain modes of carrying out the present invention are shown for illustrative purposes.

Figure 1:
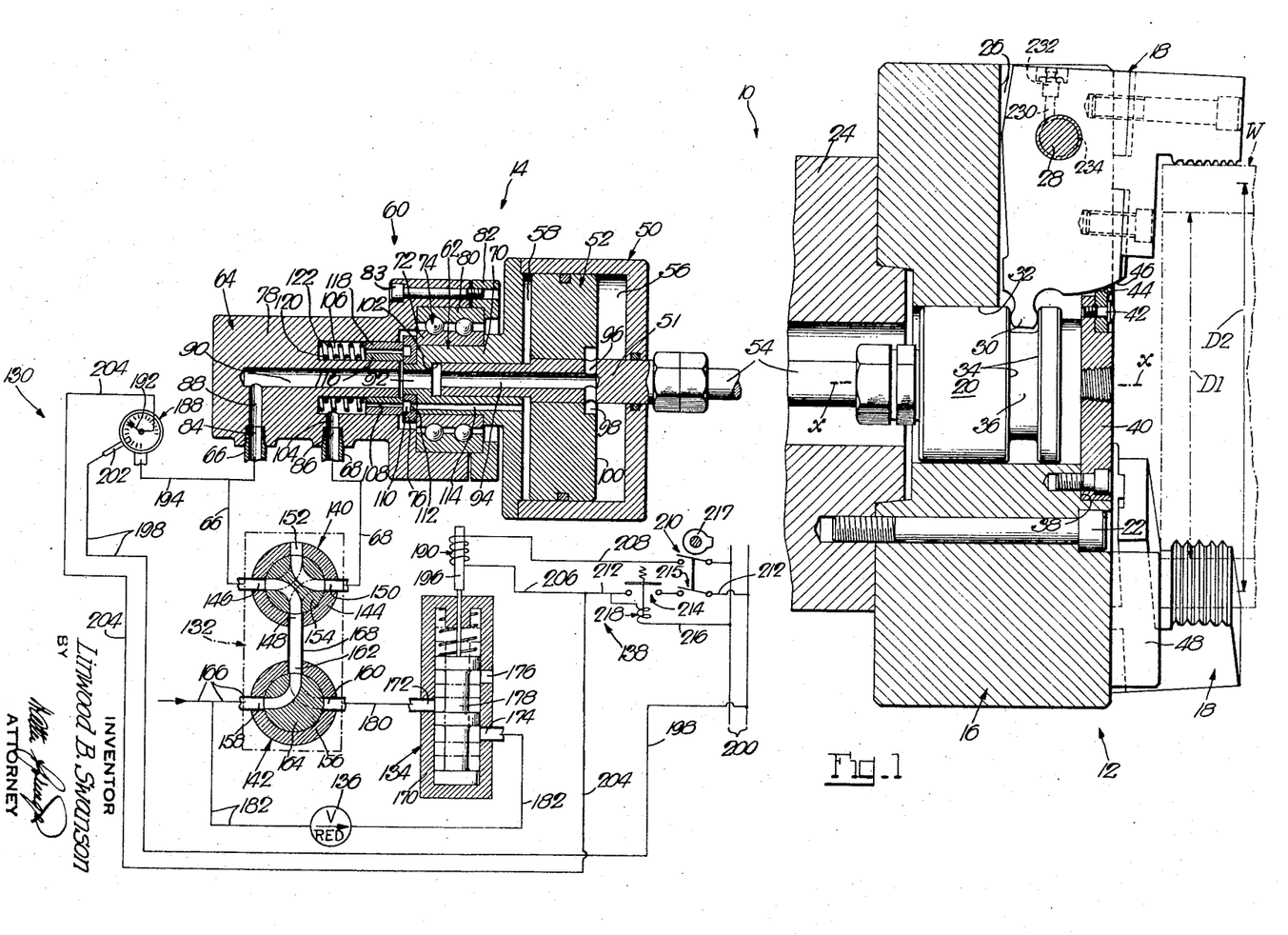
FIG. 1 is a sectional view, partly diagrammatic, of a chuck of high-low operation type embodying the invention.

Referring to the drawings, and more particularly to FIG. 1 thereof, the reference numeral 10 designates a chuck of high-low operation which comprises a chuck component 12 and an actuating component 14.

The chuck component 12, which is a separate chuck, provides a body 16 with an axis $x$, a plurality of jaws 18, and a jaw actuator 20. The chuck 12 is in this instance of rotary type, and is by bolts 22 removably secured to a power spindle 24 of a lathe or the like. Provided in the front face of the chuck body 16 are equi-angularly spaced radial ways 26 in which the jaws 18 are received. In accordance with one aspect of the present invention, the jaws 18 are rocker jaws, and to this end are pivoted in the chuck body. In the present instance, the jaws 18 are turnably mounted on pivots 28 which are fixed in the chuck body 16 and extend with their axes normal to the body axis $x$. Each of the jaws 18 has also a follower end 30, preferably roller-shaped, for cooperation with the actuator 20. The actuator 20 is in this instance a cylindrical member slidable in an axial bore 32 in the chuck body. In accordance with another aspect of the invention, the jaw actuator 20 has spaced faces 34 in parallel planes with which the follower ends 30 of the jaws 18 are in substantial line contact, and these faces 34 are in this instance formed as the opposite sidewalls of a peripheral groove 36 in the actuator 20, wth these faces or sidewalls 34 extending in planes normal to the body axis $x$. To prevent chips or other particles from entering the axial bore 32 in the chuck body and interfering with operation of the jaw actuator 20, there is mounted in an annular recess 38 in the front face of the chuck body a cover member 40, and this cover member carries at 42 shields 44 which extend into close proximity to faces 46 of the jaws which are cylindrical about their respective pivot axes to there prevent chips or other particles from entering the radial ways 26 in the chuck body and possibly binding the jaws therein.

For opening and closing the chuck, the jaw actuator 20 is moved in opposite directions. In this instance, the chuck is closed on moving the jaw actuator to the left (FIG. 1), with the jaws 18 being in this instance work "-draw-down" jaws, meaning that they not only hold work $W$ in a secure grip, but also draw the work more firmly against work rests 48 on the front face of the chuck body if the work is resting, or nearly resting, thereagainst when the jaws begin to grip the work.

The actuating component 14 includes a cylinder 50 and a piston 52 therein, of which the cylinder 50 is for its operation suitably mounted on the chuck-carrying power spindle 24 so as to be turnable with the chuck 12, and the piston 52 is slidable in the cylinder 50, and is by suitable provisions (not shown) compelled to turn with the cylinder. Piston 52 carries rod 51 which through a drawbar 54 is operatively connected with the jaw actuator 20. Thus, on admitting fluid under pressure, usually compressed air, to the right or "chuck-closing" end 56 of the cylinder 50 and venting the opposite or "chuck-opening" end 58 thereof, the jaws 18 will grip work and hold the same gripped. Conversely, on admitting fluid under pressure to the chuck-opening cylinder end 58 and venting the chuck-closing cylinder end 56, the jaws will open and release work.

With the chuck 12 and cylinder 50 being in this instance operationally turning, the actuating component 14 further includes a swivel coupling 60 with relatively turnable companion parts 62 and 64, of which part 62 is carried by, and hence turnable with, the cylinder 50, and the other part 64 is held against rotation. The swivel coupling 60 serves to provide communication between the opposite cylinder ends 56, 58 and two conduits 66 and 68 through which to supply fluid under pressure to, and vent, the respective cylinder ends 56 and 58. The coupling part 62 includes a cylindrical shank 70 on the cylinder 50 and the inner race 72 of an antifriction bearing 74 which is pressfitted on the shank 70, as well as a ring 76 which is pressfitted on a reduced end of the shank 70. The other coupling part includes a head 78, the outer race 80 of bearing 74 which is pressfitted in the head, and a retainer ring 82 which at 83 is bolted to the head 78 to hold the coupling part 64 in axial operative relation with the other coupling part 62. The operationally stationary coupling part 64 has two ports 84 and 86 for connection with the conduits 66 aand 68. Port 84 is in this instance in communication with the chuck-closing cylinder end 56 through continuing passages 88, 90 in the coupling part 64, a passage 92 in the coupling part 62, and continuing passages 94 and 96 in the piston rod 51 which lead to an annular recess 98 in the right piston face 100 (FIG. 1), with the piston rod 51 extending with a sliding fit in a machined recess 102 in the shank 70 on the cylinder 50. The other port 86 is in communication with the chuck-opening cylinder end 58 through a straight passage 104 and continuing ring-shaped passages 106 and 108 in the coupling part 64, and a ring-shaped passage 110 and continuing straight passages 112 and 114 in the other coupling part 62. The ring-shaped passage 106 is formed by a recess in the coupling part 64, and the continung ring-shaped passage 108 is formed by inner and outer rings 116 and 118 which are received with a sliding fit in the recess 106 and urged by springs 120 and 122 into face-to-face contact with the ring 76 of the other coupling part 62, with the rings 116, 118 and 76 being of any suitable wear-resistant material of good sealing properties. The ring-shaped passage 110 in the coupling part 62 is formed by an annular groove in the exposed face of the ring 76 which slides on the rings 116, 118 in the coupling part 64 when the chuck is driven.

To supply the conduits 66 and 68 with fluid under pressure and to vent the same for high-low chuck operation, the actuating component 14 further includes a fluid-pressure distributing and control device 130 which is sequentially operable, first to supply fluid under a given high pressure to the conduit 66 and vent the other conduit 68 to thereby cause closure of the chuck on work with a heavy grip and retention of the heavy work grip, then to bleed fluid from the conduit 66 until the pressure of the fluid therein drops to a given low level and hold the pressure therein at the given low level while keeping the other conduit 68 vented, to thereby decrease the work grip from heavy to a determined lighter grip and hold it at this lighter grip, and finally to supply fluid pressure to the conduit 68 and to vent the other conduit 66, to thereby open the chuck and release the work.

The device 130, which is shown diagrammatically, includes in this instance a control valve component 132. a valve 134, a pressure reducing valve 136, and a control instrumentality 138. The valve component 132 is in this instance arranged in two separate sections 140 and 142, of which the one section 140 has in its body 144 ports 146, 148 and 150 and a vent opening 152, and the shiftable valve member 154 therein has two orifices to provide communication between certain of these ports with each other and with the vent opening, with the ports 146 and 150 being in communication with the conduits 66 and 68. The other valve section 142 has in its body 156 three ports 158, 160 and 162, and the shiftable valve member 164 therein has an orifice to provide communication between certain ones of these ports, with port 158 being connected with a conduit 166 that leads from any suitable fluid source under the given high pressure, and port 162 being through a conduit 168 connected with the port 148 in the other valve section 140.

Valve 134 has in its body 170 two ports 172, 174 and a vent opening 176, and the shiftable valve member 178 therein is normally spring-urged into the full-line position in which to provide communication between the port 172 and the vent opening 176. Port 172 of this valve is through a conduit 180 connected with the port 160 of the valve section 142, and port 174 is connected with the high-pressure conduit 166 through a branch conduit 182 in which the pressure reducing valve 136 is interposed.

The control instrumentality 138 provides in this instance a pressure-sensing device 188, a relay 190, and a relay circuit. The pressure-sensing device 188 is in this instance a pressure gauge with a graduated dial and a pointer 192, and this gauge is connected with a branch 194 from the conduit 66. The relay 190 includes an armature 196 which is movable with the shiftable valve member 178 of valve 134. The relay 190 has a starting circuit and a holding circuit, with the starting circuit comprising a lead 198 from one side of a power line 200, a contact 202 which is set on the pressure gauge 188 to the given low-level pressure, the pointer 192 of this gauge, leads 204 and 206, relay 190, and a lead 208 to the other side of the power line 200, with a switch 210 being interposed in lead 208. The holding circuit of the relay 190 comprises a lead 212 from one side of the power line 200 and having interposed switches 214 and 215, a lead 216 from the other side of the power line 200 to the lead 212 and having an interposed relay 218 operatively associated with the switch 214, and the lead 206, relay 190, and lead 208 with switch 210. Switch 214 is normally open, and the switches 210 and 215 are ganged for joint opening and closing and are normally open. Thus, on closing the starting circuit of the relay 190 at the contact 202 and the pointer 192 of the pressure gauge 188, when the ganged switches 210 and 215 are closed as explained hereinafter, relay 218 is also energized to close switch 214 and thereby close the holding circuit of relay 190 and keep it closed as long as the ganged switches 210, 215 remain closed. Energization of the relay 190 causes a shift of the valve member 178 of valve 134 into the dot-and-dash line position in which to provide communication between the ports 174 and 172 and intercept communication between the port 172 and the vent opening 176.

The control valve component 132 is operable into three positions. The same is in a "first" position in which the valve members 154 and 164 assume the full-line positions, is in a "second" position in which the valve members 154 and 164 are in their full-line and dot-and-dash line positions, respectively, and is in a "third" position in which the valve members 154 and 164 are in their dot-and-dash line and full-line positions, respectively. Associated in this instance with the ganged switches 210, 215 is a cam 217 which turns with the valve member 164 of the valve component 132, with this cam 217 assuming the position shown when the valve member 164 is in its fall-line position, but being turned 90° to close the ganged switches 210, 215 when the valve member 164 is shifted to its dot-and-dash line position.

Assuming now that the chuck 12 is to undergo a high-low operation, the valve component 132 is operated to its first position (valve members 154 and 164 in their full-line positions) to admit fluid from the high-pressure source to the chuck-closing cylinder end 56 and vent the opposite cylinder end 58, with the result that the jaws close on the work W and exert a heavy grip thereon. In thus admitting high-pressure fluid to the chuck-closing cylinder end 56, the pointer 192 of the pressure gauge 188 will rise, i.e., turn clockwise, and momentarily engage the associated contact 202, resulting in momentary energization of relay 218 and closure of the associated switch 214 without, however, causing momentary energization of the relay 190 because the gauged switches 210, 215 are then open, wherefore the valve member 178 of valve 134 remains in its full-line position. The power spindle 24, and with it the chuck 12, may then be driven and the gripped work machined, for example by internally rough-machining the work from its initial internal diameter D1 to the larger internal diameter D2 at which the work W is considerably more fragile than it initially was, and would likely be fractured if internal machining were continued beyond this stage under the heavy external grip from the jaws 18. Therefore, at this stage of the operation, and while the drive of the chuck continues, the valve component 132 is operated to its second position (valve members 154 and 164 in their respective full-line and dot-and-dash line positions) in which fluid is bled from the chuck-closing cylinder end 56 via valve component 132, valve 134 and its vent opening 176, while the chuck-opening cylinder end 58 remains vented at the vent opening 152 of the valve component 132. In thus operating the valve component 132 to its second position, cam 217 is turned to close the ganged switches 210, 215 as described, thereby conditioning the described starting circuit of relay 190 for closure when the pointer 192 of the pressure gauge 188 next engages the associated contact 202. As fluid is thus bled from the chuck-closing cylinder end 56, its pressure therein drops from the initial high level, and this pressure drop also occurs at the pressure gauge 188, with the pointer 192 thereof responding in anticlockwise rotation until it engages the contact 202 and thereby closes the starting circuit of the relay 190, followed immediately by closure of the also described holding circuit thereof. With the contact 202 set at the pressure gauge 188 for the given low-level pressure as described, the pressure of the fluid in the chuck-closing cylinder end is at the same low level when the pointer 192 engages contact 202, and it is at this low-level pressure condition of the fluid in the chuck-closing cylinder end that the jaw pressure on the work is reduced to the desired lighter work grip. The jaws will then continue to exert this same lighter work grip because on energization of the relay 190, bleeding of fluid from the chuck-closing cylinder end 56 is stopped and fluid under the given low-level pressure is admitted to the chuckclosing cylinder end. Thus, on energization of the relay 190 and ensuing shift of the valve member 178 of valve 134 to its dot-and-dash line position, communication between the port 172 and vent opening 176 thereof is intercepted, and communication is provided between the ports 174 and 172 thereof, with the port 172 and, hence, the chuck-closing cylinder end 56 being then supplied with fluid under the output pressure from the pressure reducing valve 136 the input pressure of which is of the given high pressure of fluid supplied to this valve from the high-pressure fluid source via conduit 166 and the part of conduit 182 branching from the latter and extending to the valve 136. The output pressure of fluid from the reducing valve 136 is equal, or substantially equal, to the given low-level pressure, wherefore at the end of bleeding fluid from the chuck-closing cylinder end as described, the pressure of the fluid in this cylinder end will be held substantially at the given low level at which the jaws continue to exert the desired lighter work grip which is entirely safe for finish-machining the work without any danger of fracturing the same. While thus finish-machining the work, the solenoid 190 remains energized by its holding circuit, wherefore the valve member 178 of valve 134 is retained in its dot-and-dash line position in which to supply the chuck-closing cylinder end 56 with fluid under the output pressure from the pressure reducing valve 136. Thus, while during this stage of the operation the starting circuit of the relay 190 may also remain closed at the pointer 192 of the pressure gauge 188 and associated contact 202, the relay 190 will remain energized even if its starting circuit should be opened at the pointer 192 of this pressure gauge from any cause whatever, including slight fluctuations in the output pressure of the fluid from the pressure reducing valve 136.

Once the work is finish-machined, the chuck drive will be stopped, whereupon the valve component 132 is operated to its third position (valve members 154 and 164 in their respective dot-and-dash line and full-line positions), resulting in admission of fluid from the high-pressure source to the chuck-opening cylinder end 58 and simultaneous venting of the chuck-closing cylinder end 56, and hence opening of the chuck and release of the work. Also, in operating the valve component 132 to its third position, the cam 217 is returned to the position shown to permit opening of the ganged switches 210, 215 and, hence, deenergization of the solenoid 190 and spring-return of the valve member 178 of valve 134 to its full-line position in which the same is ready for the next high-low chuck operation. To start the next high-low chuck operation, it is then merely necessary to operate the valve component 132 to its first position (valve members 154 and 156 in their respective full-line positions) and repeat the procedure outlined above.

Figure 2:
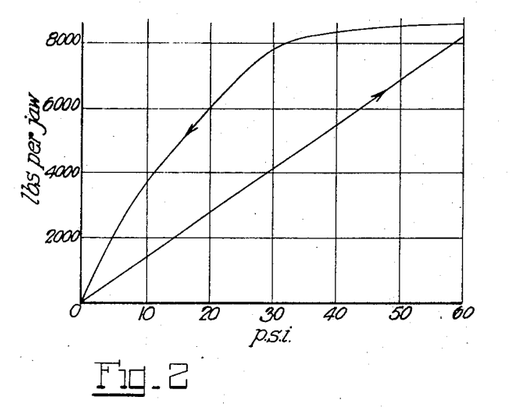
FIG. 2 is a reference diagram indicating the relationship between jaw pressure and jaw opening and closing fluid pressure for a given chuck.

The described chuck 12 will respond to the fluid-pressure distributing and control device 130 as described, including in the important respect of relaxing the jaw grip on the work from heavy to lighter to all practical intents and purposes simultaneously and proportionately with the drop of the pressure of the fluid in the chuck-closing cylinder end 56 on bleeding fluid from the latter. Responsible for this is the featured arrangement of the jaws 18 as rocker jaws, and the also featured line contact of the follower ends 30 of the jaws with the opposite surfaces 34 of the jaw actuator 20 which lie in planes parallel to each other and normal to the axis $x$ of the chuck body 16. For a better understanding of this, reference is had to FIG. 2 which shows a chart that depicts determined jaw pressures at corresponding determined air pressures in the chuck-closing cylinder end of an exemplary chuck other than that shown and described, with this exemplary chuck being a wedge-type chuck. Thus, the ascending straight line indicates the increase in the jaw pressure on work with increasing air pressure in the chuck-closing cylinder end, with the jaw pressure increasing proportionately with the increasing air pressure, while the descending curved line indicates the decrease in the jaw pressure on work with decreasing air pressure in the chuck-closing cylinder end, with the decrease in jaw pressure being way out of proportion with, and lagging greatly behind, the decrease in air pressure. This exemplary chuck will never lend itself to the featured high-low operation. Thus, if a heavy work grip of exemplary 8000 lbs. jaw pressure were to be reduced to a desired lighter work grip of exemplary 4000 lbs. jaw pressure, the descending curved line indicates that the air pressure in the chuck-closing cylinder end would have to drop to about 11 1/2 p.s.i. in order to reduce the jaw pressure to 4000 lbs., but in order to then hold the jaw pressure at the desired 4000 lbs., the air pressure in the chuck-closing cylinder end will quickly have to be increased to 29 p.s.i. as indicated by the ascending straight line. This chart is typical for other types of chucks especially in the disproportionate decrease of jaw pressure with decreasing air pressure in the chuck-closing cylinder end. The reason therefor lies in a more or less firm lock of some operating parts of these chucks in tight binding engagement with each other and other chuck parts when exerting a heavy work grip, and it requires this widely disproportionate decrease of the air pressure in the chuck-closing cylinder end in order gradually to break this lock and permit the jaws to respond in relaxation of their work grip. Thus, wedge-actuation of jaws, or guidance of jaws in machined ways, involving also more or less extensive contact areas between relatively movable chuck parts, are prime causes for such operational lock.

These prime and also other causes for such operational lock are largely eliminated in the present chuck, so much so that the jaw pressure responds to all practical intents and purposes proportionately to decreasing fluid pressure in the chuck-closing cylinder end. Thus, in the present chuck, the jaw actuator and the jaws in the specified line contact therewith cannot give rise to any operational binding lock between them at any stage of a high-low operation, and such binding as will occur between the jaws and their pivot supports on exertion by the jaws of a work grip of any magnitude will easily give way to operational stresses in the jaws that tend to, and will, relax the work grip as the pressure of the fluid in the chuck-closing cylinder end begins its scheduled intermediate drop from the given high level to the given low level.

To keep operational binding tendencies between the jaws 18 and their pivot supports 28 still lower, their bearing surfaces are preferably lubricated. To this end, each jaw 18 is provided with a duct 230 that leads to the associated pivot 28 and receives in its outer end a lubricant cup, in this instance a grease nipple 232, with the pivot 28 having over an intermediate length of its bearing surface a peripheral groove 234 to serve as a lubricant reservoir.

Figure 3:
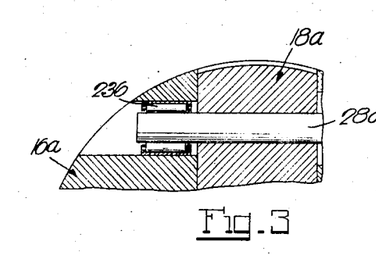
FIG. 3 is a fragmentary diagrammatic section through a modified chuck of this type.

Reference is now had to FIG. 3 which shows a modified pivot mount of the jaws 18a in which operational binding tendencies between jaw and mount are particularly low. To this end, each pivot 28a is suitably locked to its jaw 18a and the opposites projecting ends of the pivot are received in diagrammatically illustrated antifriction bearings 236 in the chuck body 16a.

While the actuating component 14 of the described chuck 10 of high-low operation is designed for the operationally turning chuck component 12, this actuating component is also fully applicable to the chuck component 12 if the same should be operationally stationary, in which case it would, of course, be feasible to omit in the actuating component the swivel coupling and, instead, provide fixed fluid passages between the fluid-pressure distributing and control device and the opposite ends of the cylinder.

Figure 4:
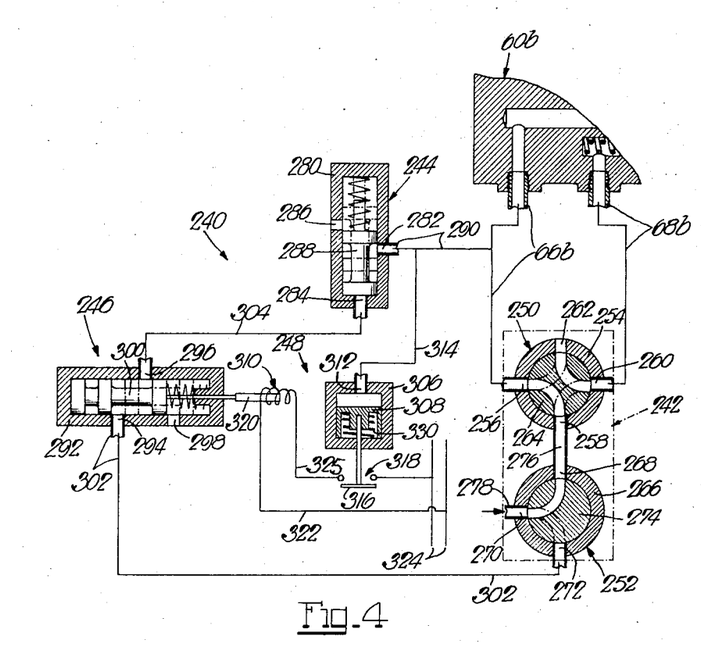
FIG. 4 is a diagrammatic view of a modified component of the chuck of FIG. 1.

The described fluid-pressure distributing and control device 130 (FIG. 1) is but one example of other feasible devices for the featured high-low operation of the chuck 12. FIG. 4 shows diagrammatically another fluid-pressure distributing and control device 240 for high-low operation of the same chuck. Thus, while in the device 130 of FIG. 1 the lighter work grip by the jaws is maintained by communication between the chuck-closing cylinder end and a fluid source of the given low-level pressure, this being in that instance the output from the pressure reducing valve 136, the present device 240 differs therefrom most fundamentally in that on bleeding fluid from the chuck-closing cylinder end to reduce the work grip from heavy to lighter, the fluid in the chuck-closing cylinder end is locked therein the moment it reaches the given low-level pressure. The present device 240 provides a control valve component 242, first and second valves 244 and 246, and a control instrumentality 248.

The valve component 242 is in this instance formed in two sections 250 and 252, of which section 250 has in its body 254 three ports 256, 258 and 260 and a vent opening 262, and the shiftable valve member 264 has two orifices to provide communication between certain of the ports with each other and with the vent opening, with the port 256 being connected with the conduit 66b which is in communication with the chuck-closing cylinder end through passages in the swivel coupling 60b, while the port 260 is connected with the conduit 68b which is in communcation with the chuck-opening cylinder end. The other valve section 252 has in its body 266 three ports 268, 270 and 272, and the shiftable valve member 274 has an orifice to provide communication between certain ones of these ports, with the port 268 being through a conduit 276 connected with the port 268 of the valve section 250, and the port 272 being connected with a conduit 278 that leads from a fluid source of the given high pressure.

The first valve 244 has in its body 280 two ports 282, 284 and a vent opening 286, and its valve member 288 is spring-urged into the full-line position in which to intercept communication between the port 282 and vent opening 286, and is shiftable into the dot-and-dash line position in which to provide such communication, with the port 282 being through a conduit 290 connected with the conduit 66b.

The second valve 246 has in its boyd 292 two ports 294,296 and a vent passage 298, and its valve member 300 is normally spring-urged into the full-line position in which to provide communication between the ports 294 and 296, and is shiftable into the dot-and-dash line position in which to provide communication between the port 296 and the vent opening 298, with port 294 being through a conduit 302 connected with the port 272 of valve section 252, and port 296 being through a conduit 304 connected with the port 284 of the first valve 244.

The control instrumentality 248 provides a cylinder 306 with a plunger 308 therein, a relay 310, and a relay circuit. The cylinder 306 has in its closed end a port 312 which through a conduit 314 is connected with the conduit 290, and the plunger 308 is normally spring-urged toward the closed cylinder end and carries the movable contact 316 of a switch 318 in the relay circuit. The relay 310 includes an armature 320 which is movable with the valve member 300 of the second valve 246. The relay circuit comprises a lead 322 from one side of a power line 324, relay 310, and a lead 325 to the other side of the power line, with the switch 318 being interposed in lead 325.

With the shiftable members 264 and 274 of the valve component 242 being in their full-line positions, fluid from the high-pressure source is admitted to the chuck-closing cylinder end and the opposite, chuck-opening cylinder end is simultaneously vented through the vent opening 262 in the valve section 250, causing the chuck jaws to close on work and exert a heavy grip thereon. While fluid under high pressure is thus admitted to the chuck-closing cylinder end, the first and second valves 244 and 246 assume their full-line positions and the plunger 308 is subjected to fluid under the same high pressure as in the chuck-closing cylinder end. The chuck may then be driven and the gripped work machined while the jaws exert their heavy grip thereon. Once this machine operation is finished, and without stopping the chuck drive, the valve component 242 is operated to the next position (valve members 264 and 274 in their respective full-line and dot-and-dash line positions). In so doing, fluid from the high-pressure source passes through conduit 302, valve 246, and conduit 304 to the port 284 of the first valve 244 to shift the valve member 288 thereof to its dot-and-dash line position in which to bleed fluid from the chuck-closing cylinder end through the vent opening 286 of this first valve. In thus bleeding fluid from the chuck-closing cylinder end, the pressure of the fluid therein drops, and so does the pressure of the fluid to which the plunger 308 is subjected, with the result that this plunger will by its spring 330 be moved toward the closed end of the cylinder 306. The plunger spring 333 is calibrated to bring the contact 316 on the plunger into position to close the switch 318 when the pressure of the fluid in the closed end of the cylinder 306, and hence also in the chuck-closing cylinder end, drops to the given low level. On closure of this switch 318, the relay circuit is closed and the energized relay 310 shifts the second valve 246 to its dot-and-dash line position in which to vent port 284 of the first valve 244 at the vent opening 298 in the second valve 246, causing spring-return of the first valve 244 to its full-line position and, hence, a stop to further bleeding of fluid from the chuck-closing cylinder end, with the fluid on the latter being then locked therein at the given low-level pressure at which the chuck jaws exert the desired lighter grip on the work. The work may then be finish-machined at the end of which the chuck drive is stopped. The valve component 242 is then operated into the final position (valve members 264 and 274 in their respective dot-and-dash line and full-line positions) in which to admit fluid from the high-pressure source to the chuck-opening cylinder end and simultaneously vent the chuck-closing cylinder end, causing opening of the chuck and release of the work. The valve component 242 is left in this final position until the next hqgh-low chuck operation is to take place, and while this valve component remains in this final position, the switch 318 is closed and the second valve 246 shifted to and held in its dot-and-dash line position. However, this switch 318 is opened and valve 246 spring-urged to its correct full-line position for the start of the next high-low chuck operation, when for that start of the operation the valve component 242 is returned to its first position (valve members 264 and 274 in their respective full-time positions).

What is claimed is:

1. A chuck of high-low operation comprising an operationally rotary chuck component having a body with an axis, a plurality of jaws, a plurality of pivots each fixed in a jaw and having opposite projecting lengths, antifriction bearings in said body in which said projecting pivot lengths are journalled, with the pivot axes being spaced from and extending normal to said body axis and the jaws being rockable about the respective pivot axes into and from work engagement, and each jaw having a follower end spaced from the associated pivot, and a member guided in said body for movement axially thereof and having two spaced faces lying in planes normal to said body axis and being in substantial line contact with said follower ends for rocking said jaws on movement of said member; and an actuating component having a cylinder with opposite first and second ends for chuck closing and opening, respectively, a movable piston in said cylinder adapted for connection with said member, a swivel coupling having relatively turnable companion parts of which one part is carried by said cylinder and the other part has first and second ports, and said coupling parts have ducts providing communication between said first port and first cylinder end and between said second port and second cylinder end, and a device sequentially operable to first supply said first port with fluid of a given high pressure and simultaneously vent said second port, then to bleed fluid from said first port to bring the pressure of the fluid therein to a given low level and hold it at said low level and simultaneously vent said second port, and finally to supply said second port with fluid pressure and simultaneously vent said first port, whereby said antifriction bearings will, on reducing the fluid pressure in said first port from said high level to said low level, release said pivot lengths therein for turning motion to reduce the jaw pressure on work substantially linearly with said fluid pressure reduction in said first port from said high level to said low level.

2. A chuck of high-low operation comprising an operationally rotary chuck component having a body with an axis, a plurality of jaws, a plurality of pivots in said body having axes spaced from and extending normal to said body axis and supporting said jaws, respectively, for rocking movement to and from work engagement, and each jaw having a follower end spaced from the associated pivot, and a member guided in said body for movement axially thereof and having two spaced faces lying in planes normal to said body axis and being in substantial line contact with said follower ends for rocking said jaws on movement of said member; and an actuating component having a cylinder with opposite first and second ends for chuck closing and opening, respectively, a movable piston in said cylinder adapted for connection with said member, a swivel coupling having relatively turnable companion parts of which one part is carried by said cylinder and the other part has first and second ports, and said coupling parts have ducts providing communication between said first port and first cylinder end and between said second port and second cylinder end, and a device sequentially operable to first supply said first port with fluid of a given high pressure and simultaneously vent said second port, then to bleed fluid from said first port to bring the pressure of the fluid therein to a given low level and hold it at said low level and simultaneously vent said second port, and finally to supply said second port with fluid pressure and simultaneously vent said first port, said device providing a first valve having third and fourth ports and a vent opening, and being spring-urged into a first position in which to provide communication between said third port and vent opening, and shiftable into a second position in which to provide communication between said third and fourth ports, with said fourth port being in communication with a first fluid source of said given low level pressure, valve means operable into first, second and third positions, to provide communication between a second fluid source of said given high pressure and said first port and simultaneously vent said second port when in said first position, to provide communication between said first and third ports and simultaneously vent said second port when in said second position, and to provide communication between said second fluid source and second port and simultaneously vent said first port when in said third position, and an instrumentality sensing the pressure of fluid in said first port, and operative in said second position of said valve means to shift said first valve into said second position when the sensed pressure reaches said given low level, and to hold said first valve in said second position while said valve means remains in said second position.

3. A chuck of high-low operation as in claim 2, which further provides a pressure reducing valve with an inlet and outlet, of which said outlet is in communication with said fourth port and constitutes said first fluid pressure source, and said inlet is in communication with said second fluid source.

4. A chuck of high-low operation, comprising an operationally rotary chuck component having a body with an axis, a plurality of jaws, a plurality of pivots in said body having axes spaced from and extending normal to said body axis and supporting said jaws, respectively, for rocking movement to and from work engagement, and each jaw having a follower end spaced from the associated pivot, and a member guided in said body for movement axially thereof and having two spaced faces lying in planes normal to said body axis and being in substantial line contact with said follower ends for rocking said jaws on movement of said member; and an actuating component having a cylinder with opposite first and second ends for chuck closing and opening, respectively, a movable piston in said cylinder adapted for connection with said member, a swivel coupling having relatively turnable companion parts of which one part is carried by said cylinder and the other part has first and second ports, and said coupling parts have ducts providing communication between said first port and first cylinder end and between said second port and second cylinder end, and a device sequentially operable to first supply said first port with fluid of a given high pressure and simultaneously vent said second port, then to bleed fluid from said first port to bring the pressure of the fluid therein to a given low level and hold it at said low level and simultaneously vent said second port, and finally to supply said second port with fluid pressure and simultaneously vent said first port, said device providing a first valve having third and fourth ports and a vent opening, and being spring-urged into a first position in which to intercept communication between said fourth port and vent opening, and shifted on admission of fluid pressure into said third port into a second position in which to provide communication between said fourth port and vent opening, with said fourth port being in communication with said first port, a second valve having fifth and sixth ports and another vent opening, and being spring-urged into a first position in which to provide communication between said fifth and sixth ports, and shiftable into a second position in which to provide a communication between said fifth port and other vent opening, with said fifth port being in communication with said third port of said third valve, valve means operable into first, second third positions, to provide communication between a fluid source of said given high pressure and said first port and vent second port when in said first position, to provide communication between said fluid source and sixth port of said second valve, vent said second port, and intercept communication between said fluid source and first port when in said second position, and to provide communication between said fluid source and second port and vent said first port when in said third position, and an instrumentality operative in said second position of said valve means to sense the pressure of fluid in said first port, and when the same reaches said given low level to shift said second valve into said second position and hold it in the latter position while said valve means remains in said second position.

* * * * *